United States Patent [19]

Everett, Jr.

[11] Patent Number: 5,045,769
[45] Date of Patent: Sep. 3, 1991

[54] INTELLIGENT BATTERY CHARGING SYSTEM

[75] Inventor: Hobart R. Everett, Jr., San Diego, Calif.

[73] Assignee: The United States of America as represented by the Secretary of the Navy, Washington, D.C.

[21] Appl. No.: 436,277

[22] Filed: Nov. 14, 1989

[51] Int. Cl.[5] ............................................. H02J 7/00
[52] U.S. Cl. .............................................. 320/2; 320/39; 414/331
[58] Field of Search ................ 320/2, 13, 39; 414/331

[56] References Cited

U.S. PATENT DOCUMENTS 3,979,657  9/1976  Yorksie ............................... 320/13
4,835,453  5/1989  Munningschmidt et al. ......... 320/13

Primary Examiner—R. J. Hickey
Attorney, Agent, or Firm—Harvey Fendelman; Thomas Glenn Keough; Michael A. Kagan

[57] ABSTRACT

The present invention is a battery charging system that provides automatic voltage selection, short circuit protection, and delayed output to prevent arcing or pitting. A second embodiment of the invention provides a homing beacon which transmits a signal so that a battery powered mobile robot may home in on and contact the invention to charge its battery. The invention includes electric terminals isolated from one another. One terminal is grounded and the other has a voltage applied to it through a resistor connected to the output of a DC power supply. A voltage scaler is connected between the resistor and the hot terminal. An On/Off controller and a voltage mode selector sense the voltage provided at the output of the voltage scaler. The On/Off controller provides an output whenever $V_a < V_H < V_b$, where $V_a$ is a reference voltage, $V_H$ is a voltage across the terminals, and $V_b$ is a reference voltage. The voltage mode selector provides an output whenever voltage $V_H$ is less than reference voltage, $V_c$. An AC power source provides current to the system power supply and to a charge supply. The system power supply provides power to the On/Off controller and the voltage mode selector. The outputs of the On/Off controller and voltage mode select are connected to separate control inputs of the charge supply.

20 Claims, 6 Drawing Sheets 5,045,769

INTELLIGENT BATTERY CHARGING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to the field of battery chargers, and more specifically to automatic battery chargers.

Charging a storage battery can be a dangerous endeavor. Hydrogen gas generated by the electrolyte of a storage battery can explode if ignited by sparks generated when connecting the terminals of the battery to an energized battery charger. Of course the power switch to the battery charger may be in the off position, however, this requires a conscious effort.

Many battery chargers provide a manual voltage select switch so that one battery charger may be used to charge batteries having different operating voltages. However, battery chargers of this type require the operator to consciously select the appropriate position of the voltage output switch. While this task is relatively simple, it may not always be followed, with the ensuing potential to overcharge the battery or cause it to explode.

Battery chargers are also used to charge the batteries of mobile platforms such as autonomous robots. A specific application of this type of system is where a battery powered robot seeks a battery charging station when a low battery voltage condition is detected by the robot. The automatic charging function of a mobile platform such as a robot can be broken down into two specific subtasks: 1) locating and homing in on the charging station, and 2) making the physical connection between the charging station and the mobile platform. Numerous proposed solutions to accomplish these tasks have been developed. Most employ a favored and sometimes specific direction of approach which significantly complicates the task of alignment and mating, and thus reduces the overall effectiveness of the system.

One standard approach calls for the alignment of a special plug on the robot with a mating receptacle on the charger. This can be done, but requires complicated hardware and software, and thus is susceptible to problems which reduce the system reliability. If the plug is designed to mate with a conventional AC distribution system, electrical shock is introduced as a potential hazard.

Another type of existing system consists of a rectangular platform with a semicircular cavity in one side, and a track tape lying on the floor, extending from the cavity. When the robot detects a low voltage battery condition, it starts searching for the track tape by random motion or by using preprogrammed information about the environment in which it is operating. If it finds the tape, the robot follows it to the charging station, where connection is made with two contacts, one on each side of the cavity. There are several disadvantages to this approach. The robot wastes a lot rapidly diminishing power searching for the tape. The tape itself must be physically installed on the floor, where it is subject to abuse. The charging station cannot easily be relocated without moving the tape and reprogramming the robot with information on where to search unless random searching is employed. The approach path is constrained to a single direction as defined by the tape. Objects which inadvertently block this path can impede a connection. Another problem with this type of system is that if the robot is not perfectly aligned when entering the cavity, a good connection may not be made.

Other approaches involve the use of coded near-infrared beacons for homing. One embodiment involves placing the beacon on a wall behind the charging unit, typically situated on the floor below. Because this is not a self-contained system, errors can arise from any subsequent displacement of the charging unit with respect to the beacon. Such displacement may result from human intervention, as for example, if the charger is moved by a cleaning crew or as a consequence of robot impact during the docking procedure.

One type of system solves this problem by placing the beacon on an enclosure roughly the size of a telephone booth which the robot enters to effect a connection. Spring contacts mate with two circular bands around the robot's base to furnish the charging current. This solution is relatively costly, less flexible in terms of relocation within the operating area, but is obtrusive. In either case, the approach of the robot to the charging station must be made within a narrowly defined window of access. This is a major drawback should the path become obstructed.

In the foregoing examples, it is very difficult for the robot to measure the distance to its charging station using ultrasonic ranging techniques as it approaches, due to problems associated with specular reflection from smooth surfaces. This provides an additional ambiguity by making it difficult for the robot to locate the target charging station.

Another problem common to all systems of this type is contact degradation at the mating surfaces of the robot and charging station due to make-and-break action of the conductors, especially where heavy charge current is employed. This problem is further aggravated due to the mechanical bounce which occurs as a consequence of the impact between the robot and charging station which can cause damaging power transients in the computer logic and control circuitry onboard the robot.

Therefore, one object of the present invention is to provide a battery charging system that may be energized while being connected to a storage battery to be charged, but which automatically delays application of charging current to the battery until after a sufficient time has elapsed to allow the battery terminals to be secured to the battery charging station. Another object of the present invention is to provide a battery charging system that automatically determines the proper voltage to be applied to the battery being charged.

Another object of the present invention is to provide an automatic charging station that will not energize its outputs if the outputs are shorted together. A further object of the present invention is to provide an automatic charging station for charging the battery of a mobile platform that indicates its precise location to the mobile platform. Another object of the present invention is to provide an automatic charging station that has a simple, yet reliable contact configuration. Still another object of the present invention is to provide an automatic charging station that minimizes degradation of the contacts of both the charging station and the mobile platform while the battery of the mobile platform is being charged.

SUMMARY OF THE INVENTION

The present invention overcomes the aforementioned limitations of present state-of-the-art battery chargers. The present invention is a battery charging system that includes electric terminals isolated from one another. One terminal is grounded and the other has a voltage applied to it through a resistor connected to the output of a DC power supply. A voltage scaler is connected between the resistor and the hot terminal. An On/Off controller and a voltage mode selector sense the voltage provided at the output of the voltage scaler. The On/Off controller provides an output whenever $V_1 < V_H < V_2$, where $V_1$ is a reference voltage, $V_H$ is a voltage across the terminals, and $V_2$ is a reference voltage. The voltage mode selector provides an output whenever voltage $V_H$ is less than reference voltage, $V_3$. An AC power source provides current to the system power supply and to a charge supply. The system power supply provides power to the On/Off controller and the voltage mode selector. The outputs of the on/off controller and voltage mode select are connected to separate control inputs of the charge supply.

A second embodiment of the present invention provides an automatic battery charging station that is suitable for automatically charging the battery of a self propelled mobile platform. The second embodiment utilizes the control circuitry described in the preceding paragraph, but also includes additional elements and features as are described herein. In the second embodiment, the hot terminal is shaped as a disk having a center axis normal to the surface of the disk. A disk shaped insulator is mounted between the hot terminal and the cylindrically-shaped grounded terminal having a longitudinal center axis. The longitudinal axis of the grounded terminal is coincident with the center axis of the hot terminal. This construction enables the hot terminal to be electrically isolated from the grounded terminal. The second embodiment also includes a radio receiver that is powered from the output of the system supply. A decoder receives outputs from the receiver and in turn provides an output to a switch that selectively connects power to a near-infrared beacon. The decoder instructs the switch to connect power to the beacon in order to activate it whenever signals provided to the decoder by the receiver indicate that a mobile platform requires a battery charge. The mobile platform is equipped with a radio transmitter which activates the receiver. The purpose of the beacon is to provide a homing signal which the platform can follow until it physically connects to the terminals of the automatic charging station. When the battery of the platform is fully charged, the platform transmits a signal to the receiver. The decoder decodes the output of the receiver and provides an output to the control input of the switch that shuts off power to the beacon.

DESCRIPTION OF THE PREFERRED EMBODIMENT

Figure 1:
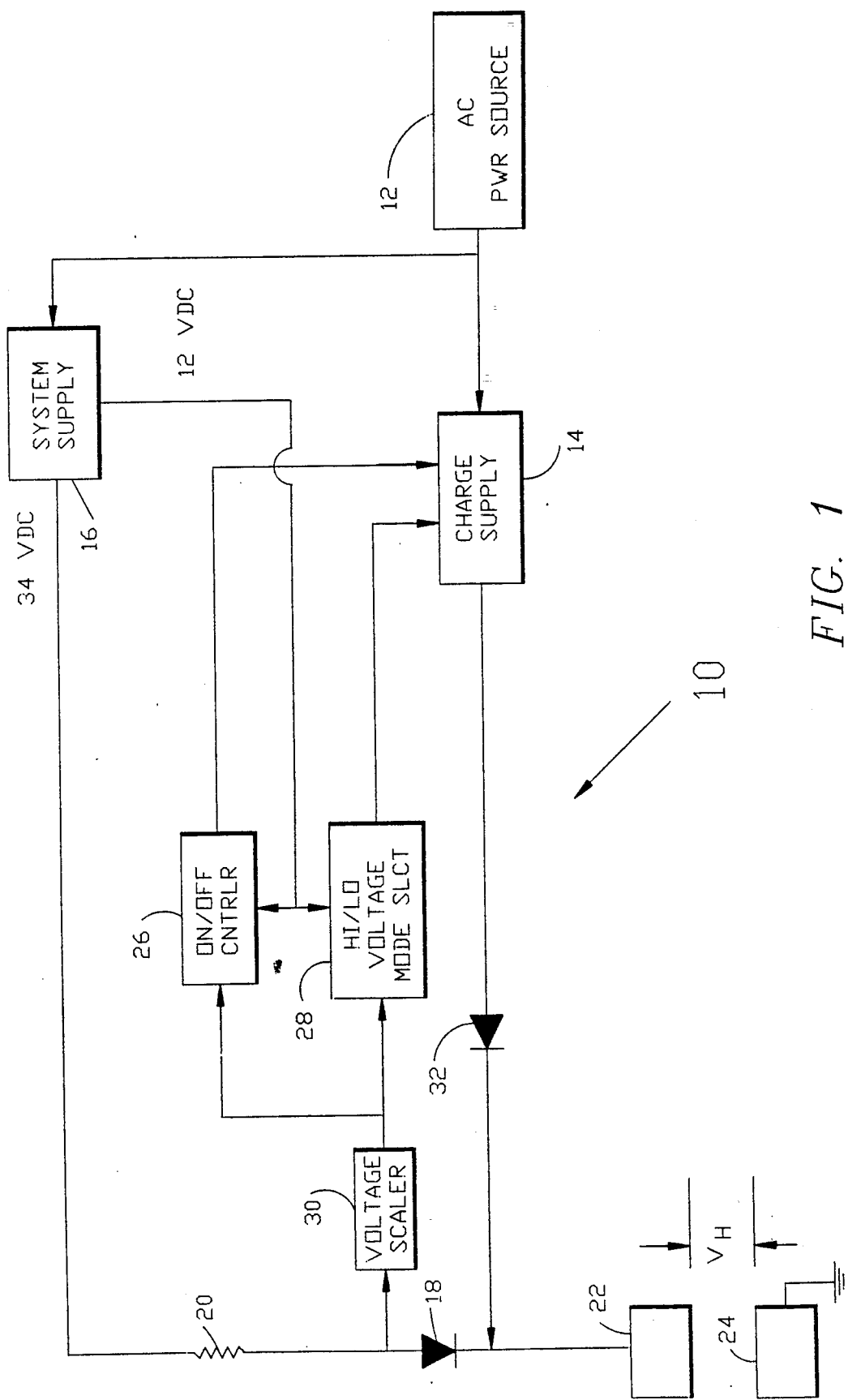
FIG. 1 is a functional block diagram of an automatic battery charging system.

Referring to FIG. 1 which is a block diagram of intelligent battery charging system 10, there is shown AC power source 12 providing power, which may be 117 VAC, to charge supply 14 and system supply 16. Charge supply 14 provides a DC current which may be used to charge a battery. System supply 16 has a dual voltage output which may be 34 VDC and 12 VDC, and is of a type which is well known to those of ordinary skill in this field of technology. The 34 VDC output of system supply 16 is connected through current-limiting resistor 20 to the input of diode 18. The output of diode 18 is connected to terminal 22, which is the positive or hot output of battery charging system 10. Terminal 24 is grounded and provides the common output of battery charging system 10. The 12 VDC output of system supply 16 is provided to on/off controller 26 and Hi/Lo voltage mode selector 28. On/off controller 26 provides an output signal which activates charge supply 14 whenever voltage $V_H$, across terminals 22 and 24, drops below a predetermined voltage reference, $V_2$, and when $V_H$ is greater than some lower voltage reference, $V_1$. Voltage $V_1$ is used as a threshold level so that battery charging system 10 does not supply charging voltage from charge supply 14 if there is a short-circuit condition across terminals 22 and 24. Hi/Lo controller 28 monitors voltage $V_H$ at terminal 22 and provides an output that is used to select the proper voltage output of battery charging system 10, as for example, a 24 or 12 volt output depending on the design voltage of any battery connected across terminals 22 and 24. The input of voltage scaler 30, which may for example, be a voltage divider, is electrically coupled to terminal 22 through diode 18. For purposes of this and all subsequent discussions herein, the voltage drop across diode 18 is neglected and the input to voltage scaler 30 is assumed equal to $V_H$ at output terminal 22. The output of voltage scaler 30 is provided to the inputs of On/Off controller 26 and Hi/Lo mode selector 28. The outputs of on/off controller 26 and Hi/Lo mode selector 28 are connected to the control inputs of charge supply 14 which provides an output to the input of diode 32. The output of diode 32 is electrically coupled to terminal 22.

Referring to FIG.'s 1, 2, and 3, collectively, Hi/Lo voltage mode selector 28 is represented by comparator 50 which may include digital comparator 112 and invertor 118. Digital comparator 112 has a positive input connected to the output of scaler 30 which can be a voltage divider comprised of resistors R1 and R2. Scaler 30 monitors the voltage across terminals 22 and 24 and divides it by a factor of approximately three before it is provided to On/Off controller 26 and Hi/Lo voltage mode select 28, shown in FIG.'s 1 and 2. The negative input of digital comparator 112 is connected to a voltage divider, comprised of resistors R3 and R4, which provides a reference voltage to digital comparator 112 which has a normally high output. If the voltage applied to the positive input of digital comparator 112 is less than the reference voltage $V_3/3$, the output of digital comparator 112 is a logic low, that is provided to the input of invertor 118. The output of invertor 118 is a control signal which is used to select the voltage output level of battery charging system 10, as will be discussed more fully herein.

Figure 2:
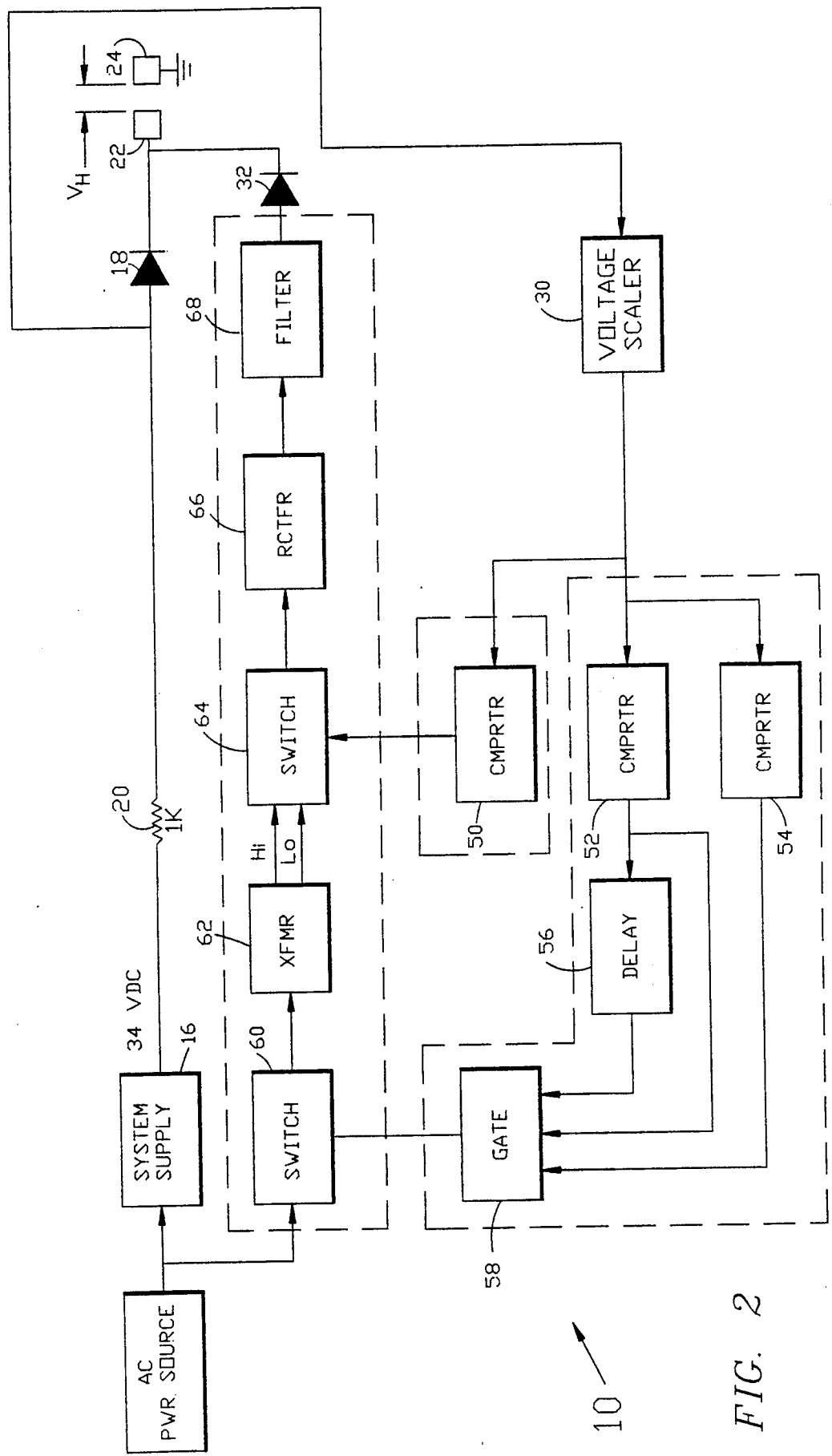
FIG. 2 is an expanded block diagram of the automatic battery charging system.

Referring to FIG. 2, on/off controller 26 is shown to include comparators 52 and 54 which each receive the output of scaler 30. The output of comparator 52 is provided to the input of delay module 56 and one of three inputs to gate 58 which may be NOR gate 126. The output of delay module 56 is provided as a second input to gate 58, but is delayed by a period that may be about two seconds after delay module 56 receives the input from comparator 52. The output of comparator 54 is provided as the third input to gate 58. Gate 58 provides an output signal which is used to activate charge supply 14 when on/off controller 26 determines that $V_1 < V_H < V_2$, as previously discussed above, but only when the three conditions represented by the outputs of comparators 52 and 54, and delay module 56 are simultaneously at specific states. Delay module 56 assures that charge supply 14 is activated after terminals 22 and 24 are securely connected to the terminals of any battery to be charged. This important feature avoids dangerous sparking which may ignite any hydrogen given off by the battery when connecting the battery to a live charging supply, prevents pitting of contact surfaces, and minimizes transients.

Figure 3:
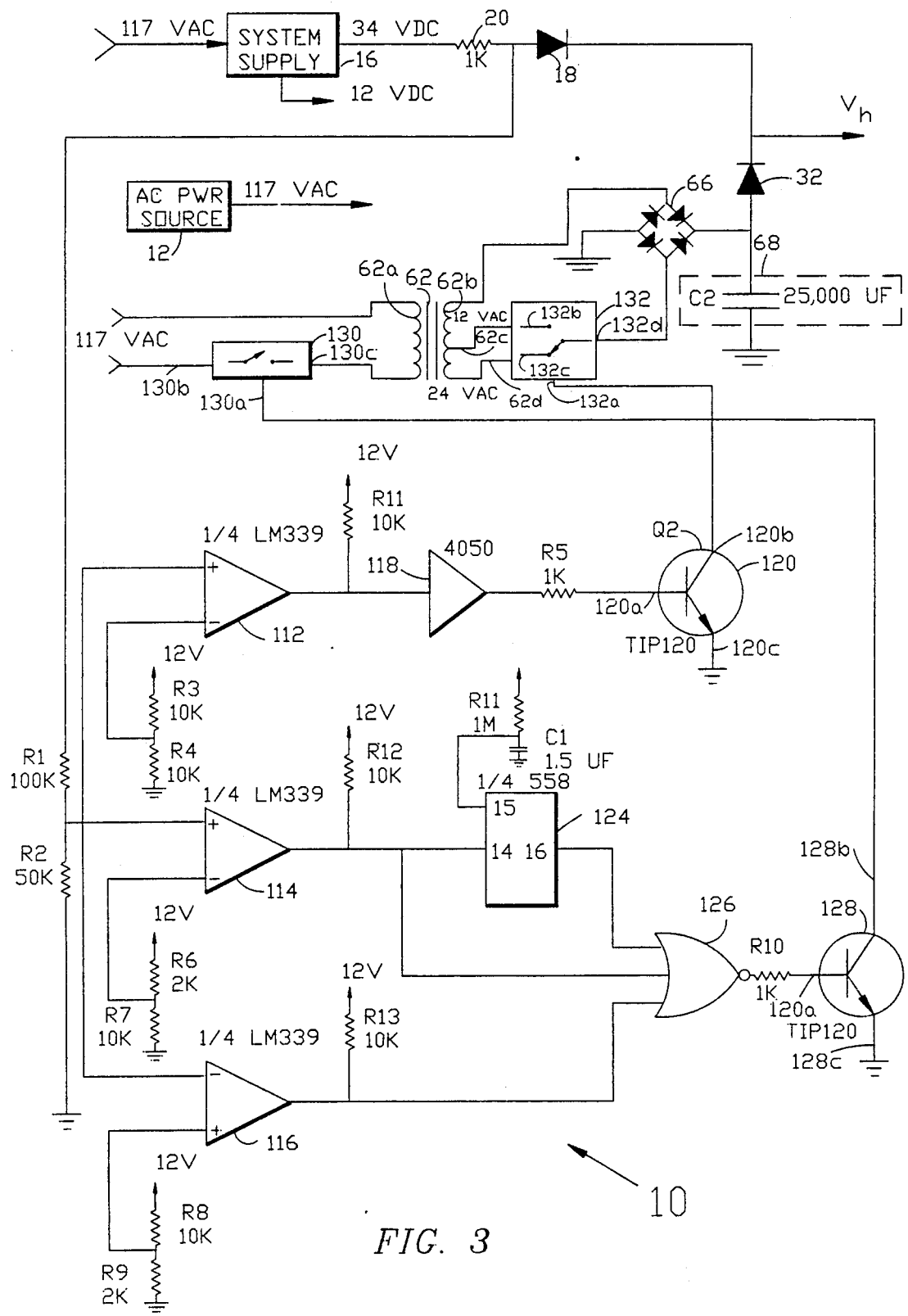
FIG. 3 is an electrical schematic of an automatic battery charging system.

Referring to FIG. 3 which shows on/off controller 26 in greater detail, comparator 52 may be implemented as digital comparator 114 having a positive input connected to the output of scaler 30. A voltage divider comprised of resistors R6 and R7 provides a reference voltage to the negative input of digital comparator 114 that corresponds to $V_2$. The output of digital comparator 114 is provided to one of the three inputs of gate 58 which may be implemented as NOR gate 126 and to the input of delay module 56 which may be one-shot multivibrator 124, having a time delay established by resistor R11 and capacitor C1. The output of multivibrator 124 is provided to one of the inputs of NOR gate 126. Comparator 54 may be implemented as digital comparator 116 having a positive input connected to the output of scaler 30. The negative input of comparator 116 receives a reference voltage corresponding to voltage $V_1$ from a voltage divider comprised of resistors R8 and R9. The output of digital comparator 116 is provided to the third input of NOR gate 126.

Referring to FIG. 2, charge supply 14 includes switch 60 having an input which receives AC power from power source 12, a control input which is connected to the output of gate 58, and an output connected to the input of transformer 62. Transformer 62 separately provides high (Hi) and low (Lo) AC voltage outputs to the two inputs of switch 64. Switch 64 has a control input connected to the output of comparator 50 and an output connected to full wave rectifier bridge 66. The output of rectifier bridge 66 is full-wave-rectified and is provided to the input of filter 68 which provides a DC voltage to the input of diode 32. The output of diode 32 is connected to hot terminal 22.

Referring to FIG. 3 which illustrates charge supply 14 in greater detail, switch 60 includes transistor 128 and switch 130. Transistor 128 has base 120a connected in series with resistor R10 and the output of NOR gate 126; collector 128b connected to switch 130; and emitter 120c connected to ground. Switch 130 includes control input 130a connected to collector 128b of transistor 128, input 130b connected to the output of power source 12, and output 130c. Switch 130 may be a single-pole, single-throw, normally open switch, as for example, an electromechanical device, such as a magnetic relay, or a solid state device, such as a triac. The output of switch 130 is connected to primary winding 62a of transformer 62. Transformer 62 has centertap secondary winding 62b which provides low voltage output 62c and high voltage output 62d. In the preferred embodiment, where the input voltage across primary winding 62a is 117 VAC, the output of secondary winding 62b will be 12 VAC at low voltage output 62c and 24 VAC at high voltage output 62d. However, it is to be understood that the scope of the invention comprehends that the voltage input and outputs may be other values than those specifically described herein, as would be within the level of ordinary skill of one practicing in this field of technology. For example, it may be desirable in some applications for one of the outputs of secondary winding 62b to be 6 VAC or 36 VAC, depending upon the particular design operating voltage of the battery to be charged.

Switch 64, depicted in FIG. 2, is illustrated in greater detail in FIG. 3 where it is shown to include transistor 120 and switch 132. Transistor 120 has base 120a connected in series with resistor R5 and the output of inverter 118; collector 120b connected to switch 132; and emitter 120c connected to ground. Switch 132 includes control input 132a connected to collector 120b of transistor 120, low voltage input 132b connected to low voltage output 62c of transformer 62, high voltage input 132c connected to high voltage output 62d of transformer 62, and output 132d connected to bridge rectifier 66. Switch 132 may be a single-pole, double-throw solid state device such as may be comprised of twin triacs, or an electromechanical device such as a relay.

Still referring to FIG. 3, the output of bridge rectifier 66 is connected to 68 which may be a capacitor and the input of diode 32. The purpose of filter 68 is to dampen the rippled full-wave-rectified output of rectifier 66 in order to provide a DC current having a flat waveform through diode 32 to output terminal 22.

The operation of battery charging system 10 is described below with reference to FIG. 3. If either a 12 volt or 24 volt battery is connected across terminals 22 and 24, the voltage $V_H$ is divided by three by resistors R1 and R2 and then is applied to comparators 112, 114, and 116.

Comparator 112 provides 12 or 24 volt voltage selection for the output of bridge 140. In one operating state, switch 122 is configured so that there is continuity between high voltage input 132c and output 132d of switch 132. This condition will provide 24 volts to rectifier 66. If the battery load of the mobile 14 platform pulls $V_H$ below reference voltage $V_3$, which may be 18 VDC, the voltage applied to the positive input of comparator 112 will be less than 6 VDC. This condition causes comparator 112 to change state from high to a low, the output of buffer 118 to go low, and transistor 120 to cut off and thus provide electrical continuity between low voltage input 132a and output 132d of switch 132.

Comparator 114 detects electrical contact across terminals 22 and 24 by sensing a voltage drop in $V_H$ from the 34 VDC provided by system supply 16 to terminal 22 whenever a battery is connected across terminals 22 and 24. Digital comparator 114 compares the scaled down value of $V_H$ with a reference voltage $V_2/3$, which may be 10 volts. When a battery having a voltage less than 34 volts, as for example, a 24 or 12 volt battery, is electrically connected across terminals 22 and 24, voltage $V_H$ is pulled down to a level corresponding to the actual voltage of the battery connected across output terminals 22 and 24. The input to comparator 114 falls below 10 volts, and the output of comparator 114 goes low and provides an input to both NOR gate 126 and delay module 124. Delay module 124 in turn provides an input to NOR gate 126 after a delay period which may be about two seconds. The purpose of delay module 124 is to prevent charge supply 14 from charging a battery until the connections between the battery connecting cables and terminals 22 and 24 are effectively made secure.

Comparator 116 provides short-circuit protection to battery charging system 10. The voltage applied to the positive input of comparator 116 must be greater than a voltage reference, $V_1/3$, which may be 2 volts (i. e., $V_H>6$ volts) in order for the output of comparator 116 to go low. In a short-circuit condition, the voltage across terminals 22 and 24 will be less than the reference voltage $V_1$ and the output of comparator 116 will be a logic high. In this condition it would not be desirable to activate charging power supply 14, and such is prevented.

If the outputs of comparators 114 and 116 are low simultaneously with the two second delayed output of delay module 124, all three inputs to NOR gate 126 will be at a logic low, causing gate 126 to provide a logic high output to transistor 128. The output of NOR gate 126 provides an input voltage signal to base 128a of NPN transistor 128 which in turn provides an input to control input 130a of switch 130. This condition causes switch 130 to close and connect power source 12 across primary winding 62a of transformer 62, the result of which is the availability of 12 VAC and 24 VAC at low voltage output 62c and high voltage output 62d of secondary winding 62b of transformer 62. Then depending on the voltage level present at the positive input of digital comparator 112, either 24 or 12 VAC is provided to rectifier 66, which outputs a full-wave-rectified current that is filtered by filter 68 and provided to output terminal 22. Thus, the battery to be charged is charged to its correct design operating voltage level.

Current-limiting resistor 20, which may be 1K, allows the 34 volt output of system supply 16 to drop to the voltage level of the applied load, in this case, the battery to be charged. By measuring this reduced voltage, intelligent charging system 10 can: 1) ensure that there is no short-circuit condition across terminals 22 and 24; 2) determine that a battery load has been connected across terminals 22 and 24, and activate charge supply 14; and 3) select a proper voltage output for the battery to be charged. Blocking diodes 18 and 32 ensure no mutual interference from power supplies 14 and 16 which are connected to output terminal 22.

Figure 4:
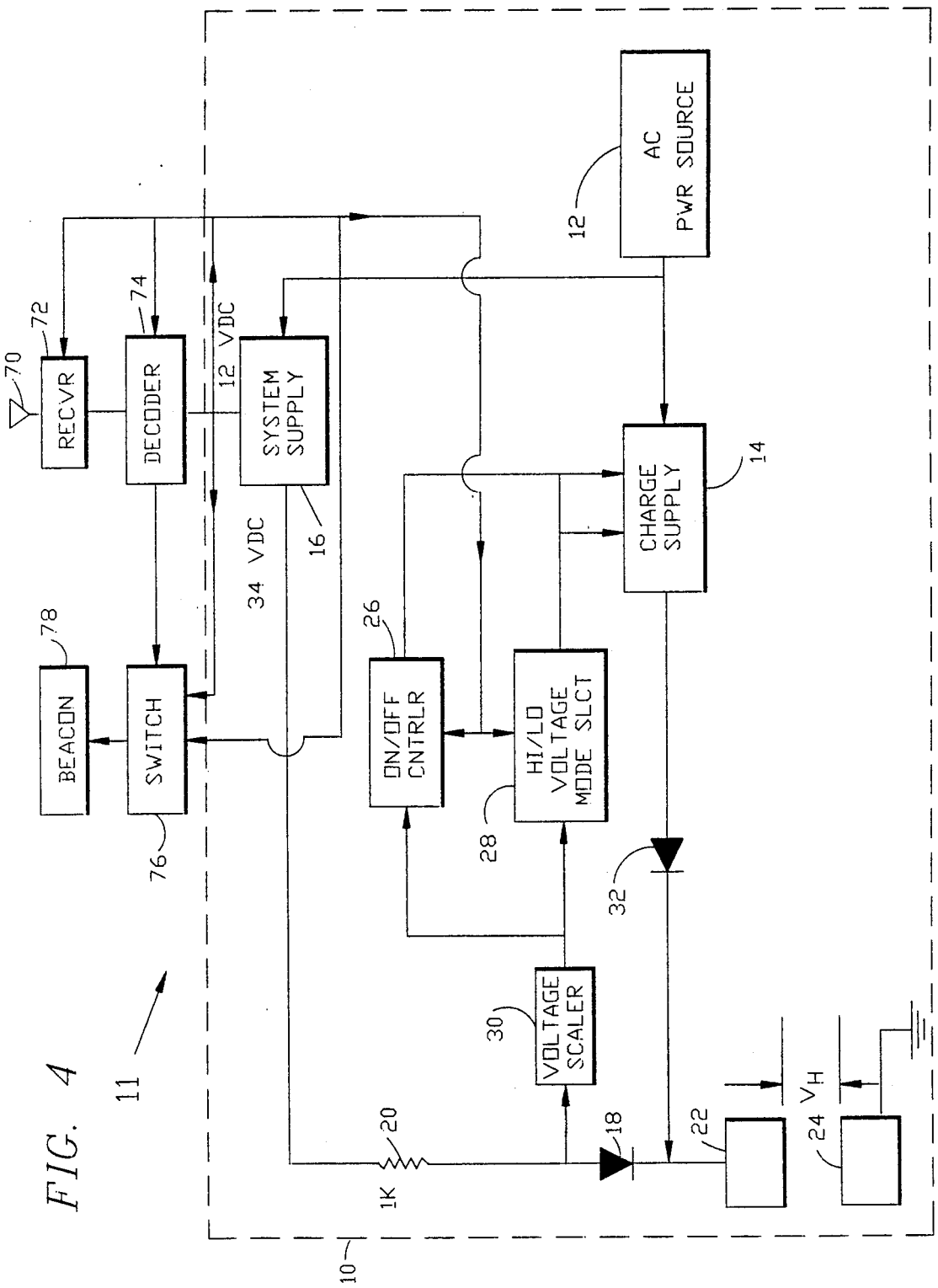
FIG. 4 is a functional block diagram of an automatic battery charging station for charging a mobile platform.

A second embodiment of the present invention is illustrated in FIG. 4 and includes battery charging system 10 as described above and depicted in FIG.'s 1-3, but also includes the additional elements described below. The combination of these additional elements and battery charging system 10 provide an intelligent battery charging system that is suitable for automatically charging the battery of a mobile platform such as a robot and which is able to communicate its position to the robot.

Antenna 70 is operably coupled to radio receiver 72 which receives electrical power, such as 12 VDC, from system supply 16. Receiver 72 may be of the type typically found in a home automatic garage door opener system, as is well known and commercially available. The output of receiver 72 is provided to the input of decoder 74. Decoder 74 receives a power input which may be 12 VDC. The output of decoder 74 is connected to the control input of switch 76 which also has a power input electrically connected to the output of AC power source 12. Switch 76 is a single-pole, single-throw, normally open switch. The output of switch 76 is connected to beacon 78, which in the preferred embodiment is a near-infrared light source. When a robot detects a low battery voltage condition, it may transmit signals such as coded pulses for purposes of activating a homing beacon mounted on charging station 11. Receiver 72 detects the transmissions from the robot. A first type of signal pattern indicates that the robot needs to physically contact terminals 22 and 24. A second type of signal pattern indicates that the connection has been made. Decoder 74 provides an output to the control input of switch 76 which causes electrical power to be provided through switch 76 in order to activate beacon 78 whenever a signal pattern of the first type is received by receiver 72. Whenever a signal of the second type is received by receiver 72, the output of decoder 74 to the control input of switch 76 ceases to provide a signal, causing power to be disconnected through switch 76, thus shutting beacon 78 off.

Figure 5:
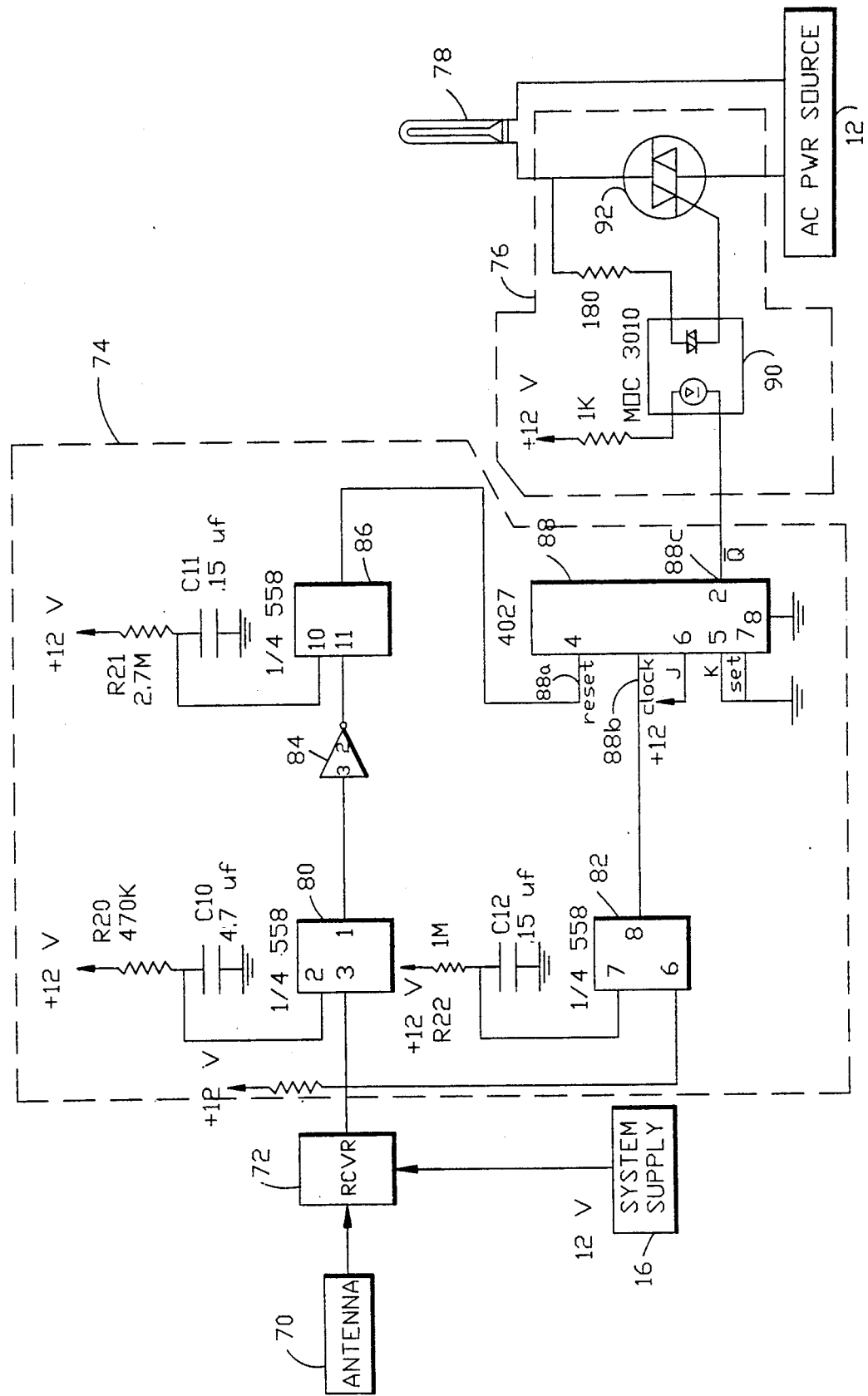
FIG. 5 is an electrical schematic of an automatic battery charging station for charging a mobile platform.

A schematic diagram illustrating decoder 74, switch 76, and beacon 78 in greater detail is presented in FIG. 5. Antenna 70 is operably coupled to receiver 72. Decoder 74 may include monostable multivibrators 80, 82, 86, and flip-flop 88. Specifically, the output of receiver 72 is connected to the inputs of monostable multivibrators 80 and 82. The period of multivibrator 80 may be five seconds and is established by resistor R20 and capacitor C10 in accordance with well known techniques. The period of multivibrator 82 may be 125 milliseconds and is established by resistor R22 and capacitor C12. The output of multivibrator 80, which is normally low, is a pulse provided to the input of invertor 84 having an output that is connected to the input of multivibrator 86. The period of multivibrator 86, which is significantly less than the period of multivibrator 80 and may, for example be 250 milliseconds, is established by resistor R21 and capacitor C11. The output of multivibrator 86 is connected to the reset input 88a of flip-flop 88. The output of multivibrator 82 is connected to clock input 88b of flip-flop 88.

The output of flip-flop 88 is provided to the control input of switch 76 which may be opto-isolator triac driver 90 or an electromechanical relay. The load circuit of triac driver 90 is coupled to the gate of triac 92. The anodes of triac 216 are connected in series between a AC power input 12 and beacon 78.

Still referring to FIG. 5, the outputs of monostable multivibrators 80, 82, and 84 are normally low, but become a logic high in response to an input having a high to low transition. When receiver 72 detects only one pulse within any five second interval as established by the period of multivibrator 80, multivibrator 80 triggers and provides a transition which triggers multivibrator 86. Multivibrator 86 17 then in turn provides a 250 millisecond pulse to reset input 88a of flip-flop 88. Concurrently, multivibrator 82 provides a pulse to clock input 88b of flip-flop 88. The reset condition causes output 88c of flip-flop 88 to go high so that no current flows through triac 92 and beacon 78. If receiver 72 detects two pulses within the five second period of multivibrator 80, multivibrator 80 provides only one pulse to multivibrator 86, which in turn outputs a single pulse to reset input 88a of flip-flop 88. However, multivibrator 82 outputs two pulses to clock input 88a of flip-flop 88. The second clock pulse causes the output of flip-flop 88 to go low because reset input 88a is now low, thus activating beacon 78. In other words, two pulses received within a five second period will activate beacon 78. One pulse received within five seconds deactivates beacon 78.

Figure 6:
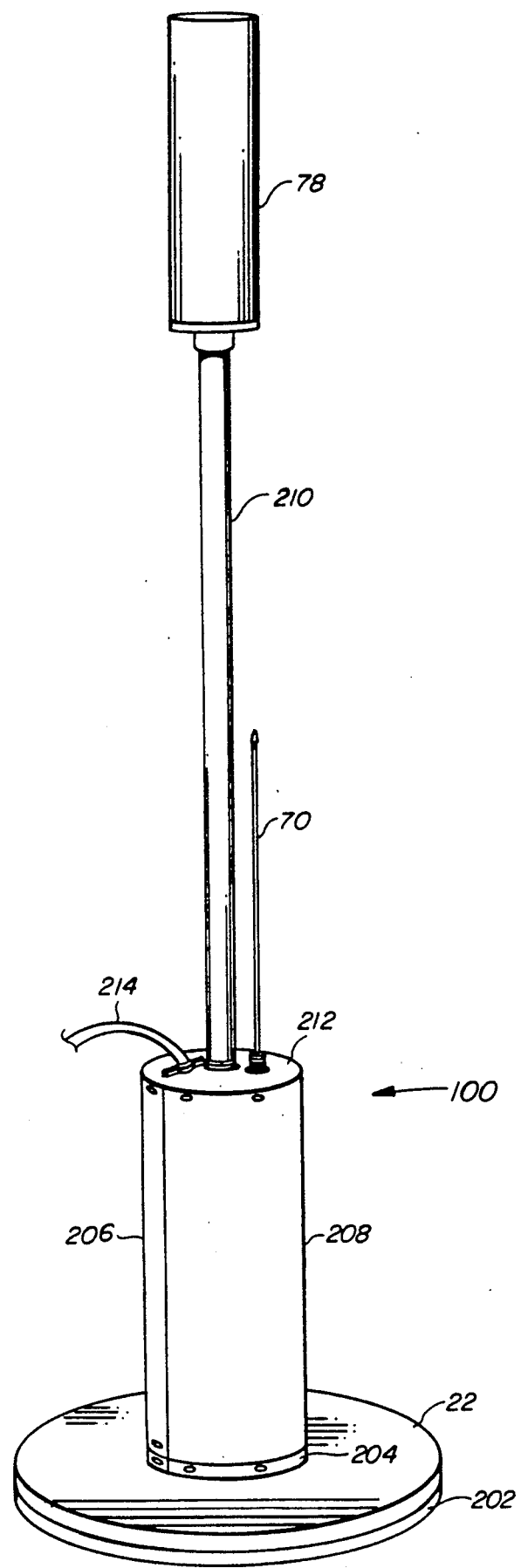
FIG. 6 is a perspective view of an automatic charging station for use with a mobile platform such as a robot.

The circuits depicted in FIG.'s 4 and 5 are mounted within automatic battery charging system stand 100, as shown in FIG. 6, which includes electrically conductive output terminal 22 mounted on non-skid electrically insulating plate 202, which may be fabricated from materials such as rubber or neoprene. Terminal 22 may be fabricated of aluminum, however it may also have a surface consisting of any other electrically conductive metal such as copper, tin, or stainless steel. Electrically insulating spacer 204, which for example may be disc shaped plexiglass, is secured between terminal 22 and hollow cylindrical housing 206, which may include arcuate-shaped removable cover plate 208. Housing 206 has an electrically conductive outer surface which is ground output terminal 24, fabricated from aluminum or any other electrically conductive metal. The cylindrical shape of housing 206 and disc shape of terminal 22 are important features that facilitate attainment of electrical continuity between terminals 22 and 24 and a mobile platform approaching from any direction in the horizontal plane. The surface of housing 206 is electrically insulated from terminal 22 by insulating spacer 204. Support 210, which may be a tube, is mounted to top end surface 212 of cylindrical housing 206 and supports beacon 78 that selectively transmits a homing signal in a 360 degree pattern. Power to activate beacon 78 may be provided by cable, not shown, extending from the interior of housing 206 through the interior of support 210. In the preferred embodiment, beacon 78 transmits near-infrared light by means well known by those of ordinary skill in this art, as for example, by an incandescent bulb (not shown) positioned within a near-infrared filter (not shown) and which all may be situated within a transparent tube, such as plexiglass. Beacon 78 may also consist of a circular array of near infrared light emitting diodes.

Antenna 70 may be mounted to top end surface 212 of housing 206 and is operably coupled to receiver 72 (refer to FIG. 3) which is mounted within housing 206. Electrical power cord 214, provides power to operate automatic charging station 11 and may extend into the interior of housing 206 through top end surface 212.

Performance values or model numbers for the various components schematically represented the FIGURES are presented by way of example.

Obviously, many modifications and variations of the present invention are possible in light of the above teachings. It is therefore to be understood that within the scope of the appended claims the invention may be practiced otherwise than as specifically described.

I claim:

1. A battery charging system, comprising:
   a first electric terminal;
   a second electric terminal electrically isolated from said first terminal and grounded;
   an alternating current power source having an output;
   a system power supply having an input connected to said output of said alternating current power source, and first and second direct current outputs;
   a current-limiting resistor having a first resistor terminal electrically connected to said first direct current output of said system power supply and a second resistor terminal;
   a first diode having an input electrically connected to said second resistor terminal of said resistor and an output electrically connected to said first terminal;
   charging power supply means having a power input electrically connected to said output of said alternating current power source, first and second control inputs, and a direct current power output;
   a second diode having an input electrically connected to said power output of said charging power supply means and an output electrically connected between said output of said first diode and said first terminal;
   voltage scaler means having an input electrically connected between said second resistor terminal of said resistor and said input of said first diode and an output, for providing a voltage output that is linearly related to a voltage potential of said first terminal detected at said input of said voltage scaler means;
   on/off controller means having a power input electrically connected to said second direct current output of said system supply, a voltage sensing input electrically connected to said output of said voltage scaler means, and an output electrically connected to said first control input of said charging power supply means, for providing an output whenever $V_1 < V_H < V_2$, $V_1$ is a first reference voltage, $V_H$ is a voltage across said first and second terminals, and $V_2$ is a second reference voltage, said on/off controller means being electrically grounded in common with said second terminal; and
   a voltage mode selector means having a power input electrically connected to said second direct current output of said system supply, a voltage sensing input electrically connected to said output of said voltage scaler means, and an output electrically connected to said second control input of said charging power supply means, for providing an output whenever said voltage $V_H$ is less than a third reference voltage, $V_3$, said voltage mode selector means being electrically grounded in common with said second terminal.

2. The battery charging system of claim 1 wherein; said on/off controller means includes:
   a first comparator having an input connected to said output of said voltage scaler means and an output, said first comparator providing an output whenever a voltage detected at said input of said first comparator is less than a reference voltage $V_b$;
   a delay having an input electrically connected to said output of said first comparator and an output;
   a second comparator having an input electrically connected to said output of said voltage scaler means and an output, said second comparator providing an output whenever a voltage detected at said input of said second comparator is greater than a reference voltage $V_a$; and a gate having a first input electrically connected to said output of said first comparator, a second input electrically connected to said output of said delay, and a third input electrically connected to said output of said second comparator, said gate providing an output whenever simultaneously, said output of said first comparator is at a first comparator output level, said output of said second comparator is at a second comparator output level, and said output of said delay is at a predetermined output level: and said voltage mode selector means includes:
a third comparator having an input electrically connected to said output of said voltage scaler means and an output, said second comparator providing an output whenever a voltage detected at said input of said second comparator is less than a reference voltage $V_c$.

3. The battery charging system of claim 2 wherein:
said first comparator is a digital comparator;
said second comparator is a digital comparator;
said third comparator is a digital comparator;
said delay is a monostable one-shot multivibrator; and
said gate is a NOR gate.

4. The battery charging system of claim 3 wherein:
said charging power supply means includes:
a first switch having an input electrically connected to said output of said power source, a control input electrically connected to said output of said gate, and an output;
a transformer having a primary winding electrically connected to said output of said first switch and a centertap secondary winding having high and low voltage outputs;
a second switch having a first input electrically connected to said low voltage output of said secondary winding, a second input electrically connected to said high voltage output of said secondary winding, and control input electrically connected to said output of said third comparator, and an output;
a full wave rectifier having an input electrically connected to said output of said second switch and an output; and
a filter having an input electrically connected to said output of said rectifier and an output electrically connected to said input of said second diode.

5. The battery charging system of claim 4 wherein:
said first switch is a single-pole, single-throw, normally open switch.

6. The battery charging system of claim 5 wherein:
said first switch includes:
a first transistor having a base electrically coupled to said output of said third comparator and a collector; and
an electromechanical relay having a control input electrically connected to said collector of said first transistor.

7. The battery charging system of claim 5 wherein:
said second switch is a single-pole, double-throw switch.

8. The battery charging system of claim 7 wherein:
said second switch includes:
a second transistor having a base electrically connected to said output of said gate and a collector electrically connected to said control input of said second switch; and an electromagnetic relay having a control input electrically connected to said collector of said second transistor.

9. The battery charging system of claim 5 wherein:
said voltage scaler is a voltage divider.

10. An automatic battery charging station, comprising:
a first electric terminal shaped as a disk having a center axis normal to the surface of said disk;
a disk shaped insulator having first and second sides, said first side being centrally mounted on the flat side of said first terminal;
a second terminal having a cylindrical shape and a longitudinal center axis, said second terminal being mounted to said second side of said insulator such that said longitudinal axis of said second terminal is coincident with said center axis of said first terminal, said second terminal being electrically isolated from said first terminal;
an alternating current power source having an output;
a system power supply having an input connected to said output of said alternating current power source, and first and second direct current outputs;
a current-limiting resistor having a first resistor terminal electrically connected to said first direct current output of said system power supply and a second resistor terminal;
a first diode having an input electrically connected to said second resistor terminal of said resistor and an output electrically connected to said first terminal;
charging power supply means having a power input electrically connected to said output of said alternating current power source, first and second control inputs, and a direct current power output;
a second diode having an input electrically connected to said power output of said charging power supply means and an output electrically connected between said output of said first diode and said first terminal;
voltage scaler means having an input electrically connected between said second resistor terminal of said resistor and said input of said first diode and an output, for providing a voltage output that is linearly related to a voltage potential of said first terminal detected at said input of said voltage scaler means;
on/off controller means having a power input electrically connected to said second direct current output of said system supply, a voltage sensing input electrically connected to said output of said voltage scaler means, and an output electrically connected to said first control input of said charging power supply means, for providing an output whenever $V_1 < V_H < V_2$, where $V_1$ is a first reference voltage, $V_H$ is a voltage across said first and second terminals, and $V_2$ is a second reference voltage, said on/off controller means being electrically grounded in common with said second terminal; and
a voltage mode selector means having a power input electrically connected to said second direct current output of said system supply, a voltage sensing input electrically connected to said output of said voltage scaler means, and an output electrically connected to said second control input of said charging power supply means, for providing an output whenever said voltage $V_H$ is less than a third reference voltage, $V_3$, said voltage mode selector means being electrically grounded in common with said second terminal;

a receiver having a power input electrically connected to said second direct current output of said system supply and an output;

decoder means having an input electrically connected to said output of said receiver and an output;

a beacon activation switch having a first power input electrically connected to said output of said alternating current power source, a second power input electrically connected to said second direct current output of said system supply, a signal input electrically connected to said output of said decoder, and an output; and a beacon electrically connected to said output of said beacon activation switch.

11. The automatic battery charging station of claim 10 wherein;

said on/off controller means includes:

a first comparator having an input connected to said output of said voltage scaler means and an output, said first comparator providing an output whenever a voltage detected at said input of said first comparator is less than a reference voltage $V_b$;

a delay having an input electrically connected to said output of said first comparator and an output;

a second comparator having an input electrically connected to said output of said voltage scaler means and an output, said second comparator providing an output whenever a voltage detected at said input of said second comparator is greater than a reference voltage $V_a$; and a gate having a first input electrically connected to said output of said first comparator, a second input electrically connected to said output of said delay, and a third input electrically connected to said output of said second comparator, said gate providing an output whenever simultaneously, said output of said first comparator is at a first comparator output level, said output of said second comparator is at a second comparator output level, and said output of said delay is at a predetermined output level: and said voltage mode selector means includes:

a third comparator having an input electrically connected to said output of said voltage scaler means and an output, said second comparator providing an output whenever a voltage detected at said input of said second comparator is less than a reference voltage $V_c$.

12. The automatic battery charging station of claim 11 wherein:

said first comparator is a digital comparator;
said second comparator is a digital comparator;
said third comparator is a digital comparator;
said delay is a monostable one-shot multivibrator; and
said gate is a NOR gate.

13. The automatic battery charging station of claim 12 wherein:

said charging power supply means includes:

a first switch having an input electrically connected to said output of said power source, a control input electrically connected to said output of said gate, and an output;

a transformer having a primary winding electrically connected to said output of said first switch and a centertap secondary winding having high and low voltage outputs;

a second switch having a first input electrically connected to said low voltage output of said secondary winding, a second input electrically connected to said high voltage output of said secondary winding, and control input electrically connected to said output of said third comparator, and an output;

a full wave rectifier having an input electrically connected to said output of said second switch and an output; and a filter having an input electrically connected to said output of said rectifier and an output electrically connected to said input of said second diode.

14. The automatic battery charging station of claim 13 wherein:

said first switch is a single-polew, single-throw, normally open switch.

15. The automatic battery charging station of claim 14 wherein:

said first switch includes:

a first transistor having a base electrically coupled to said output of said third comparator and a collector; and an electromechanical relay having a control input electrically connected to said collector of said first transistor.

16. The automatic battery charging station of claim 14 wherein:

said second switch is a single-pole, double-throw switch.

17. The automatic battery charging station of claim 16 wherein:

said second switch includes:

a second transistor having a base electrically connected to said output of said gate and a collector electrically connected to said control input of said second switch; and an electromagnetic relay having a control input electrically connected to said collector of said second transistor.

18. The automatic battery charging station of claim 14 wherein:

said voltage scaler is a voltage divider.

19. The automatic battery charging station of claim 14 wherein:

said decoder means includes:

a first multivibrator having an input operably coupled to said output of said receiver and an output;

an invertor having an input operably connected to said output of said first multivibrator and an output;

a second multivibrator having an input and an output, said input of said second multivibrator being operably connected to said output of said invertor;

a third multivibrator having an input operably coupled to said output of said receiver and an output; and a flip-flop having a reset input operably coupled to said output of said second multivibrator, a signal input operably coupled to said output of said third multivibrator, and an output.

20. The automatic battery charging station of claim 19 wherein:

said third switch includes:

an opto-isolator triac driver having an input electrically connected to said output of said flip-flop and an output; and a triac having a gate operably connected to said output of said opto-isolator triac driver and an anode operably connected to said beacon.

* * * * *